(12) United States Patent
Karidis et al.

(10) Patent No.: US 6,912,121 B2
(45) Date of Patent: Jun. 28, 2005

(54) PERSONAL COMPUTER DEVICE HAVING CONSTANT TILT DISPLAY WITH ADJUSTABLE HEIGHT

(75) Inventors: John P. Karidis, Ossining, NY (US); Kenichi Tanaka, Sagamihara (JP); Hideyuki Usui, Chigasaki (JP)

(73) Assignee: International Business Machines Corporation, Armonk, NY (US)

( * ) Notice: Subject to any disclaimer, the term of this patent is extended or adjusted under 35 U.S.C. 154(b) by 12 days.

(21) Appl. No.: 10/353,295

(22) Filed: Jan. 28, 2003

(65) Prior Publication Data

US 2003/0142474 A1 Jul. 31, 2003

(30) Foreign Application Priority Data

Jan. 28, 2002 (JP) ......................................... 2002-019207

(51) Int. Cl.[7] ................................................. G06F 1/16
(52) U.S. Cl. ....................... 361/681; 361/683; 345/110; 248/455
(58) Field of Search ............................... 361/681, 683, 361/682, 726–727, 686; 248/161, 917–923, 157, 429, 346.03, 346.04; 345/7, 87, 168, 903, 905; 364/708.1; 312/223.2, 223.3; 349/58; 362/23, 31, 551, 561, 500, 559, 341

(56) References Cited

U.S. PATENT DOCUMENTS

| | | | | | |
|---|---|---|---|---|---|
| 4,834,329 A | * | 5/1989 | Delapp | ..................... | 248/183.3 |
| 4,859,092 A | * | 8/1989 | Makita | ........................ | 400/83 |
| 5,085,394 A | * | 2/1992 | Torii | ........................... | 248/455 |
| 5,168,426 A | * | 12/1992 | Hoving et al. | .............. | 361/681 |
| 5,206,790 A | * | 4/1993 | Thomas et al. | ............. | 361/681 |
| 5,666,694 A | * | 9/1997 | Slow et al. | ................... | 16/368 |
| 5,835,342 A | * | 11/1998 | Hunte | ........................ | 361/681 |
| 6,191,937 B1 | * | 2/2001 | Bang | .......................... | 361/681 |
| 6,288,891 B1 | * | 9/2001 | Hasegawa et al. | .......... | 361/681 |
| 6,353,529 B1 | * | 3/2002 | Cies | ........................... | 361/681 |
| 6,392,871 B1 | * | 5/2002 | Yanase | ....................... | 361/681 |
| 6,430,038 B1 | * | 8/2002 | Helot et al. | ................. | 361/681 |
| 6,437,973 B1 | * | 8/2002 | Helot et al. | ................. | 361/681 |
| 6,480,373 B1 | * | 11/2002 | Landry et al. | ............. | 361/680 |
| 6,612,668 B2 | * | 9/2003 | Doan | ...................... | 312/223.2 |
| 6,654,234 B2 | * | 11/2003 | Landry et al. | ............. | 361/681 |
| 6,771,494 B2 | * | 8/2004 | Shimano | ..................... | 361/681 |
| 2002/0145847 A1 | * | 10/2002 | Crosby | ....................... | 361/683 |
| 2003/0052856 A1 | * | 3/2003 | Nakamura | .................. | 345/110 |

FOREIGN PATENT DOCUMENTS

| | | | | | |
|---|---|---|---|---|---|
| JP | 410228243 A | * | 8/1998 | ............. | G09F/9/00 |
| JP | 411149255 A | * | 6/1999 | ............. | G09F/9/00 |

* cited by examiner

Primary Examiner—Michael Datskovskiy
(74) Attorney, Agent, or Firm—Joscelyn G. Cockburn

(57) ABSTRACT

The present invention provides a notebook PC with a monitor that enables a user to have better handling of the PC and viewing of the display of the device when using the PC. A PC includes a monitor and a main unit that are connected to each other by an arm through a first hinge portion and a second hinge portion. In the present invention, the angle of tilting of the monitor is constantly maintained even when the position in height of the monitor is changed.

20 Claims, 13 Drawing Sheets

PERSONAL COMPUTER DEVICE HAVING CONSTANT TILT DISPLAY WITH ADJUSTABLE HEIGHT

BACKGROUND OF THE INVENTION

1. Field of the Invention

The present invention relates generally to information handling systems (IHS) and devices therein and more particularly to computers having a monitor that may be conveniently adjusted.

2. Description of Related Art

IHS equipment such as computers (including notebooks, personal computers, etc.) are becoming smaller in size, in part, for improved portability. A notebook personal computer (PC) typically has a main unit with a keyboard, and a display unit that is connected to the main unit in such a manner so that the display unit may be freely opened and closed as a cover on the main unit. When in a closed position, the display unit typically covers the keyboard portion of the main unit. When the notebook PC is used thereafter, the display unit is opened so that the keyboard of the main unit and the screen (i.e., monitor) provided in the display unit are exposed and viewable to a user.

Typically, a user of a portable PC will move the PC from place to place, depending on the user's needs. For example, a user may decided to use the portable PC at a remote location (i.e., a location away from user's home or office), in transit (i.e., such as on an airplane or train to a user's destination), and similar. In each of these situations, it is desirable by the user to be able to conveniently view the display unit of the PC.

It is known that numerous efforts have been made over time with respect to adjusting the position or the angle of the display unit of a PC to enable a user to easily view the screen of the display unit. For example, Published Unexamined Utility Model Application No. 5-36523 and Published Unexamined Patent Application No. 8-179854, each of which is incorporated herein by reference, disclose techniques for adjusting the position or the angle of the display unit of a notebook PC. According to each of these referenced techniques, the main unit and the display unit of the notebook PC are connected by an arm, wherein one end of the arm is connected by a hinge to the main unit and the other end of the arm is connected by a hinge to the display unit. By this configuration, these techniques disclose a manner for freely adjusting the height of the display unit relative to the main unit and also to freely set the angle of the display unit.

However, in the notebook PCs described in Published Unexamined Utility Model Application No. 5-36523 and Published Unexamined Patent Application No. 8-179854the display unit also tilts in conjunction with the movement of the arm when a user changes the height of the display unit by holding and moving the arm and some other portions. It is possible for a user to hold and move the display unit so that the angle of the display unit with respect to the user is constant. However, it is difficult to change the height of the display unit while maintaining the angle since the display unit is comparatively large.

SUMMARY OF THE INVENTION

Accordingly, there is a need for an apparatus that overcomes the problems discussed above. With the foregoing discussion in mind, it is a purpose of the present invention to provide a computer, inclusive of a monitor, that may be better handled and viewed by a user.

According to one embodiment, the present invention is a computer having a monitor with a display screen, a main unit having a controlling means for controlling display on the display screen, and an arm which connects the monitor and the main unit to each other. Preferably the arm includes a front plate, having one end rotatably connected to a first pivot of the main unit and the other end rotatably connected to a second pivot of the monitor; a rear plate having one end rotatably connected to a third pivot of the main unit and the other end rotatably connected to a fourth pivot of the monitor, such that the rear plate is linked to the front plate; and a resilient component provided on at least one of the front plate and the rear plate for applying a rotating force in a direction that moves the monitor away from the main unit. By way of example, a user of the present invention is able to easily raise the monitor of the computer from the main unit, since the rotating force is applied to at least one of the plates, and the rear plate constituting the arm. In a preferred embodiment, the second pivot and the fourth pivot are provided at a lower end of the monitor.

According to another embodiment of the present invention, the second pivot and the fourth pivot are provided at an end of the main unit and function to operate as hinges for setting the monitor in a state of being opened or closed with respect to the main unit.

In a preferred embodiment of the present invention, the distance between the first pivot and the third pivot and the distance between the second pivot and the fourth pivot are substantially equal to each other and the distance between the first pivot and the second pivot and the distance between the third pivot and the fourth pivot are also substantially equal to each other.

According to another embodiment, the present invention is a computer having a display means for displaying an image to a user, a control means for controlling the image displayed by the display means, an accommodation means for accommodating the control means, a connection means connecting the accommodation means and the display means to each other and capable of freely setting the distance between the display means and a viewing point of the user within a predetermined range, and a load means for imposing a load such that a force necessary for moving the display means away from the viewing point is larger than a force necessary for bringing the display means closer to the viewing point when the distance is adjusted.

The connection means maintains the angle of the display means with respect to the viewing point even when the distance is changed. Additionally, in a preferred implementation, the connection means is accommodated in a recessed portion provided in a surface of the accommodation means.

According to another embodiment, the present invention is a monitor unit connected to a computer, in which a user may readily grasp the present invention. In this embodiment, the monitor unit has a monitor in which a display screen is formed, an arm extending from the monitor, a fixing portion in which the monitor and the arm are supported, a first hinge portion which rotatably connects the fixing portion and the arm to each other, a second hinge portion which rotatably connects the monitor and the arm to each other, and a resilient component for applying a rotating force in such a direction that the arm is moved away from the fixing portion. In a preferred embodiment, the arm has a front plate which extends from a front portion of the first hinge portion to a front portion of the second hinge portion, and a rear plate which extends from a rear portion of the first hinge portion to a rear portion of the second hinge portion. Preferably, in this case, the front plate and the rear plate are connected to the front portion of the first hinge portion and the rear portion of the first hinge portion with a predetermined spacing set therebetween.

According to another embodiment, the present invention is a support structure for supporting a front face unit facing a user, wherein the support structure is capable of holding the front face unit at a predetermined angle such that the invention may be grasped by a user. In this embodiment, the support structure has an arm connected to the front face unit so as to be rotatable on an axis in a lateral direction perpendicular to a longitudinal direction from a front portion to a rear portion of the front face unit, a base unit connected to the arm so as to be rotatable along the lateral axis by a predetermined external force in order to support the front face unit, a signal processing portion which performs transmitting and receiving of signals between the front face unit and a computer connectable to the front face unit. Preferably, the arm has a first supporting member which extends from the front portion of the front face unit and is connected to the base unit, a second supporting member which extends from the rear portion of the front face unit, is connected to the base unit, and is linked to the first supporting member, and a resilient component which applies a rotating force in such a direction that the second supporting member is moved away from the base unit. In a preferred embodiment, the first supporting member is connected to a front portion of the base unit, and the second supporting member is connected to a rear portion of the base unit.

Preferably, a shape approximating a parallelogram is formed by a first connecting portion in the base unit to which the first supporting member is connected, a second connecting portion in the front face unit to which the first supporting member is connected, a third connecting portion in the base unit to which the second supporting member is connected, and a fourth connecting portion in the front face unit to which the second supporting member is connected. Additionally, in a preferred implementation, the support structure is mounted on a portable precision component.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

The use of figure reference labels in the claims is intended to identify one or more possible embodiments of the claimed subject matter in order to facilitate the interpretation of the claims. Such labeling is not to be construed as necessarily limiting the scope of those claims to the embodiments shown in the corresponding figures. The preferred embodiments of the present invention and its advantages are best understood by referring to the drawings, like numerals being used for like and corresponding portions of the various drawings. Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
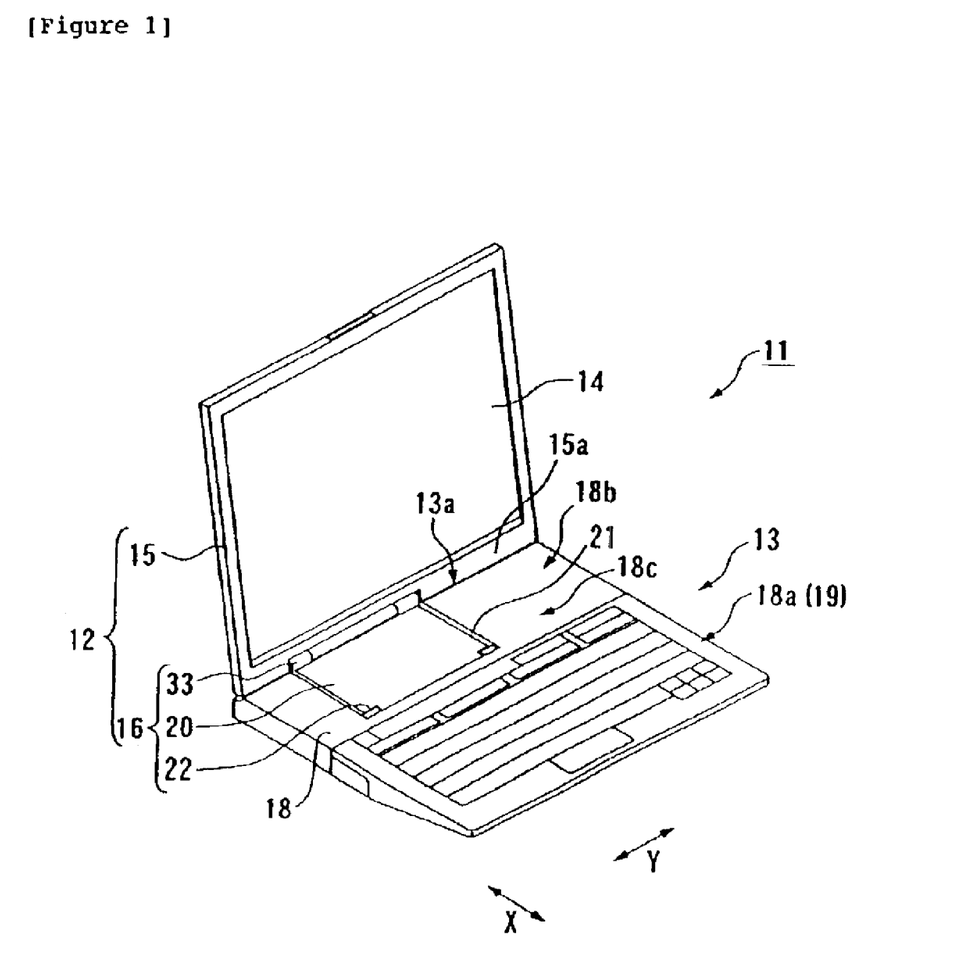
FIG. 1 is a perspective view for explaining the entire construction of a notebook PC according to an embodiment of the present invention.
Figure 2:
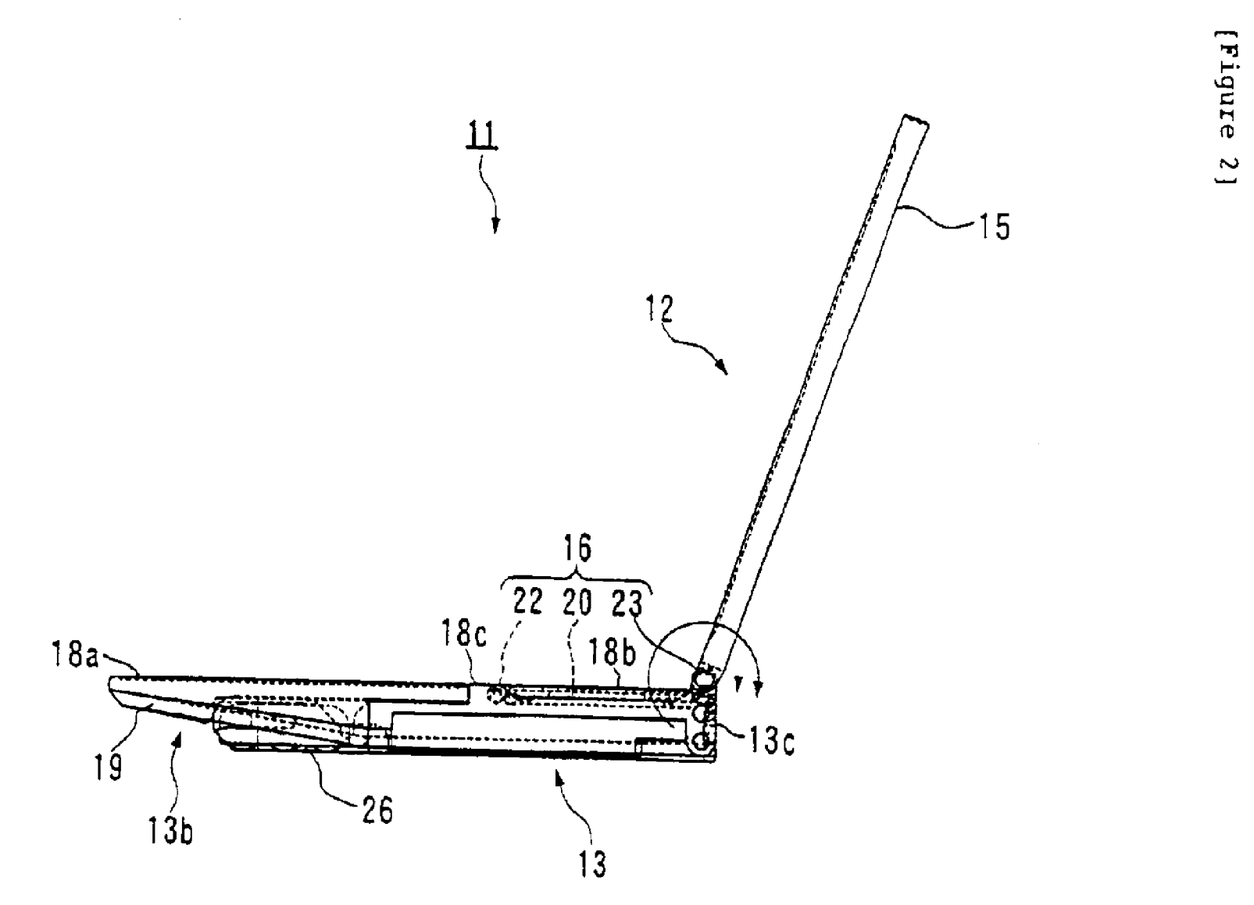
FIG. 2 is a side view of the notebook PC in the state shown in FIG. 1.

FIG. 1 is a perspective view for explaining the entire construction of a notebook PC (computer) 11 according an embodiment of the present invention. FIG. 1 shows the state of the notebook PC 11 when the notebook PC 11 is used. FIG. 2 is a side view of the notebook PC 11 in the state shown in FIG. 1.

The notebook PC 11 shown in FIGS. 1 and 2 has a monitor unit 12 and a main unit 13. The monitor unit 12 has a monitor (front face unit) 15 with a display screen 14, and a hinge portion 16 which connects the monitor 15 and the main unit 13. The monitor 15 of the monitor unit 12 functions as a cover on the main unit 13. When the PC is used, the hinge portion 16 is rotated in the direction of the arrow indicated in FIG. 2 to open the cover.

In the main unit 13, a central processing unit (CPU), a hard disk drive, memories, etc. are accommodated. The details of a computation made, for example, by the CPU, are displayed on the display screen 14, and display on the display screen 14 is controlled by the CPU. A battery unit 26, in which a battery is accommodated, is attached to a front portion 13b of the main unit 13 on the bottom surface side of the same. The main unit 13 has a keyboard 19 provided in a front portion 18a of its upper surface 18, and a recessed portion 21 which is formed in its upper surface 18 between a rear portion 18b and a central portion 18c of the upper surface 18, and in which an arm 20 having a hinge portion 16 is accommodated.

The hinge portion 16 includes an arm 20, a first hinge portion 22 for connecting the arm 20 to the main unit 13, and a second hinge portion 23 for connecting the arm 20 and the monitor 15. Each of the first hinge portion 22 and the second hinge portion 23 is rotatable about an axis extending in a direction (Y-direction) perpendicular to the front-rear direction of the main unit 13 (X-direction as viewed in the figure). The arm 20 is formed into the shape of a plate and has, in its end edge portions in the X-direction, axes on which the first hinge portion 22 and the second hinge portion 23 rotate respectively. The first hinge portion 22 is provided on the keyboard 19 side of the central portion 18c of the upper surface 18 of the main unit 13.

The second hinge portion 23 is connected to a lower end portion 15a of the monitor 15 and is positioned at a rear end edge 13a of the main unit 13 when the arm 20 is accommodated in the recessed portion 21. In the state shown in FIGS. 1 and 2, therefore, the second hinge portion 23 functions as an opening/closing hinge portion for opening/closing the main unit 13 and the monitor 15. Thus, the notebook PC 11 can be used in a state such as shown in FIG. 1.

Figure 3:
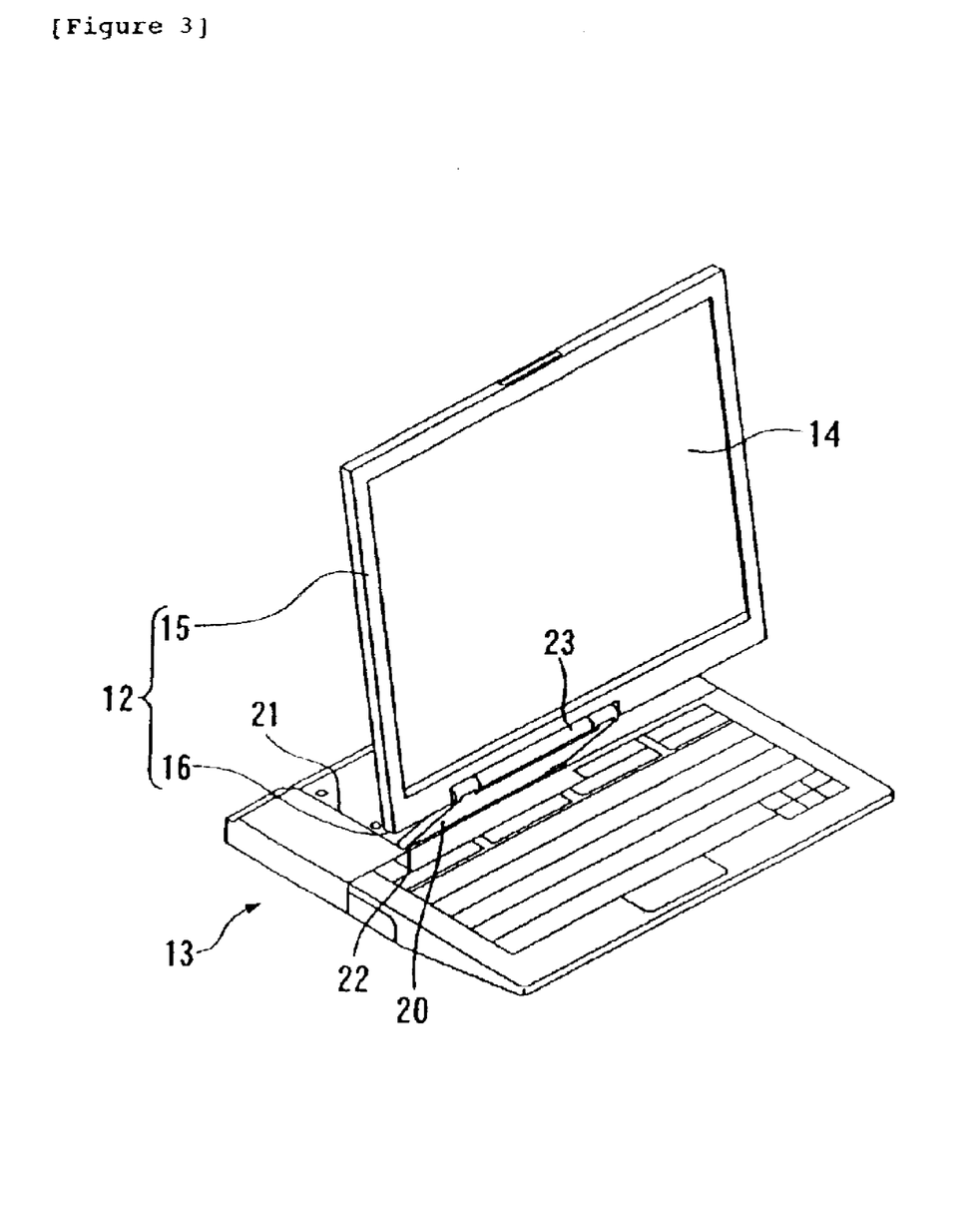
FIG. 3 is a perspective view of the notebook PC shown in FIGS. 1 and 2 when the position and the angle of the monitor in the notebook PC are changed.
Figure 4:
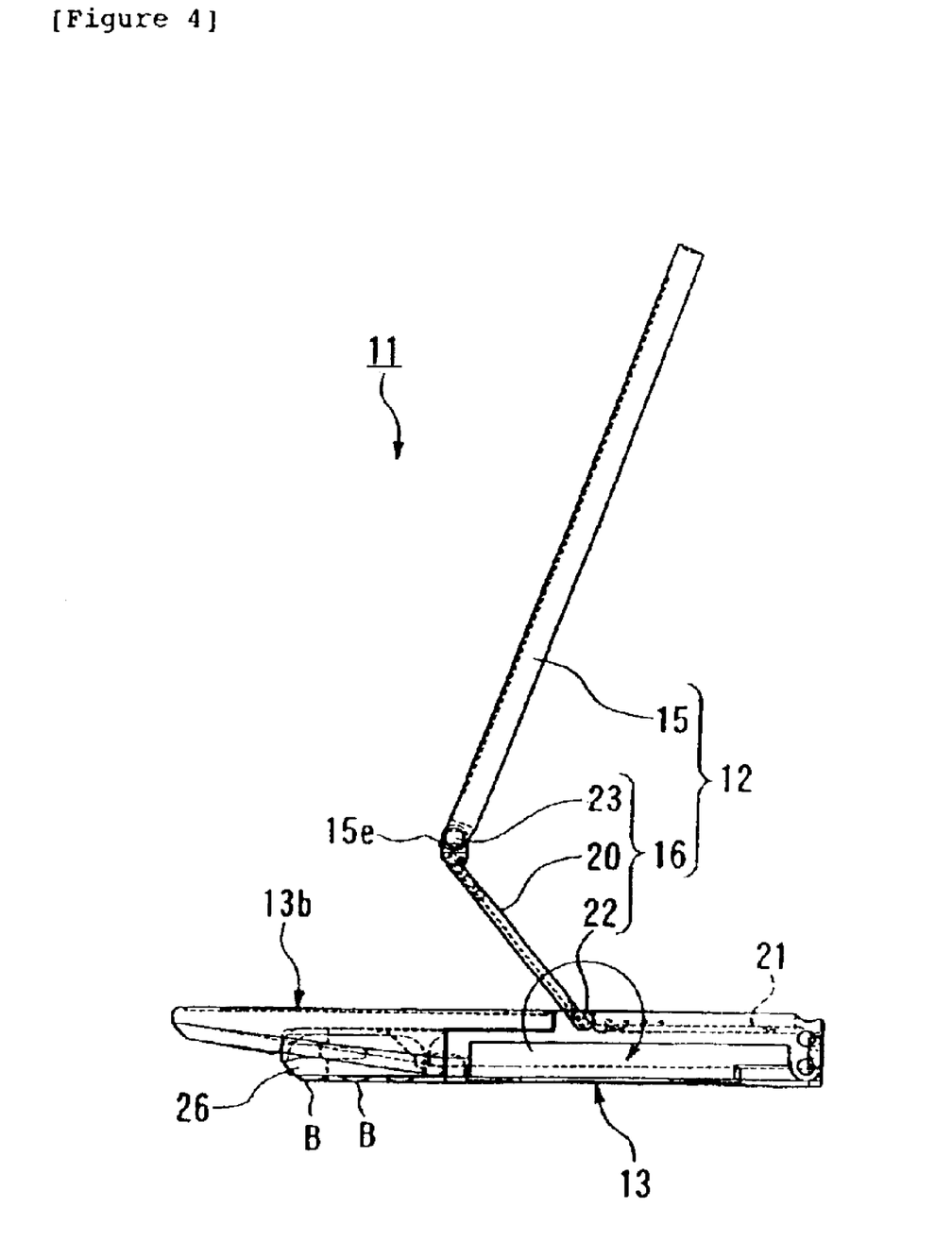
FIG. 4 is a side view of the notebook PC in the state shown in FIG. 3.
Figure 5:
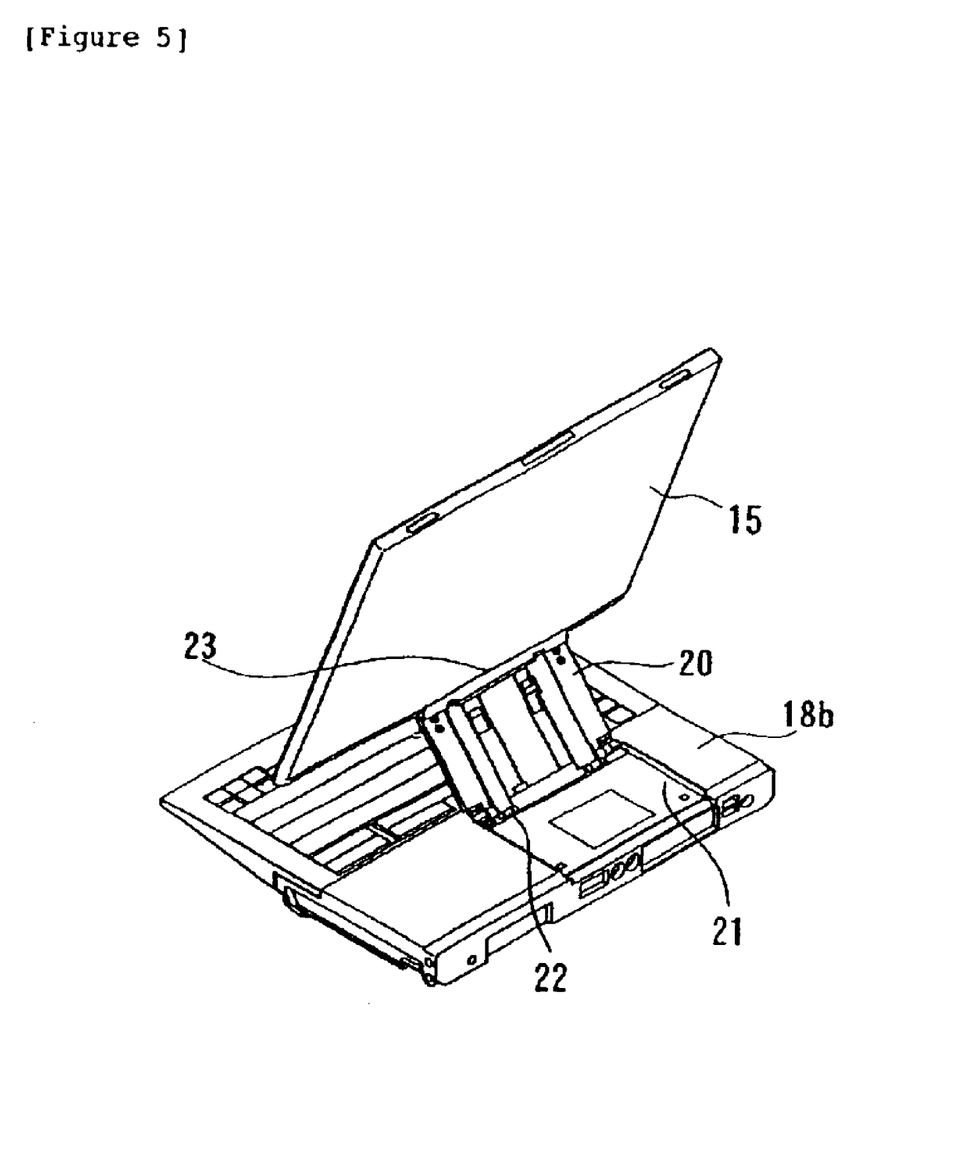
FIG. 5 is a rear perspective view of the notebook PC in the state shown in FIG. 3.

FIG. 3 is a perspective view of the notebook PC 11 shown in FIGS. 1 and 2 when the position and the angle of the monitor 15 in the notebook PC 11 are changed. FIG. 4 is a side view of the notebook PC 11 in the state shown in FIG. 3. FIG. 5 is a rear perspective view of the notebook PC 11 in the state shown in FIG. 3.

The notebook PC 11 shown in FIGS. 1 and 2 can also be used in the various other arrangements, for instance as shown in FIGS. 3, 4, and 5. That is, referring to FIGS. 3, 4, and 5, the portion of the arm 20 other than the portion adjacent to the first hinge portion 22, may be moved apart from the recessed portion 21 of the main unit 13, and the arm 20 is raised by being rotated on the first hinge portion 22. The position of the monitor 15 is thereby moved upward relative to its position shown in FIGS. 1 and 2.

In this state, each of the first hinge portion 22 and the second hinge portion 23 can be freely fixed at an opening angle in a predetermined range. Thus, each of the first hinge portion 22 and the second hinge portion 23 can be set at a predetermined angle and the position or the angle of the monitor 15 relative to the main unit 13 can be freely adjusted by changing the position of the arm 20. The stiffness of the joint between the first hinge portion 22 or the second hinge portion 23 and the mating member is adjusted by using a latch or meshing mechanism to enable support of the monitor 15.

As described above, the monitor 15 is connected by the arm 20 in the notebook PC 11 so that each of the position (height) of the monitor 15 and the angle of the monitor 15 with respect to the main unit 13 can be freely set. In this embodiment, the position of the monitor 15 can be smoothly changed without changing the angle of tilt of the monitor 15. The structure for connection between the arm 20, the first hinge portion 22 and the second hinge portion 23 will be described in detail.

Figure 6:
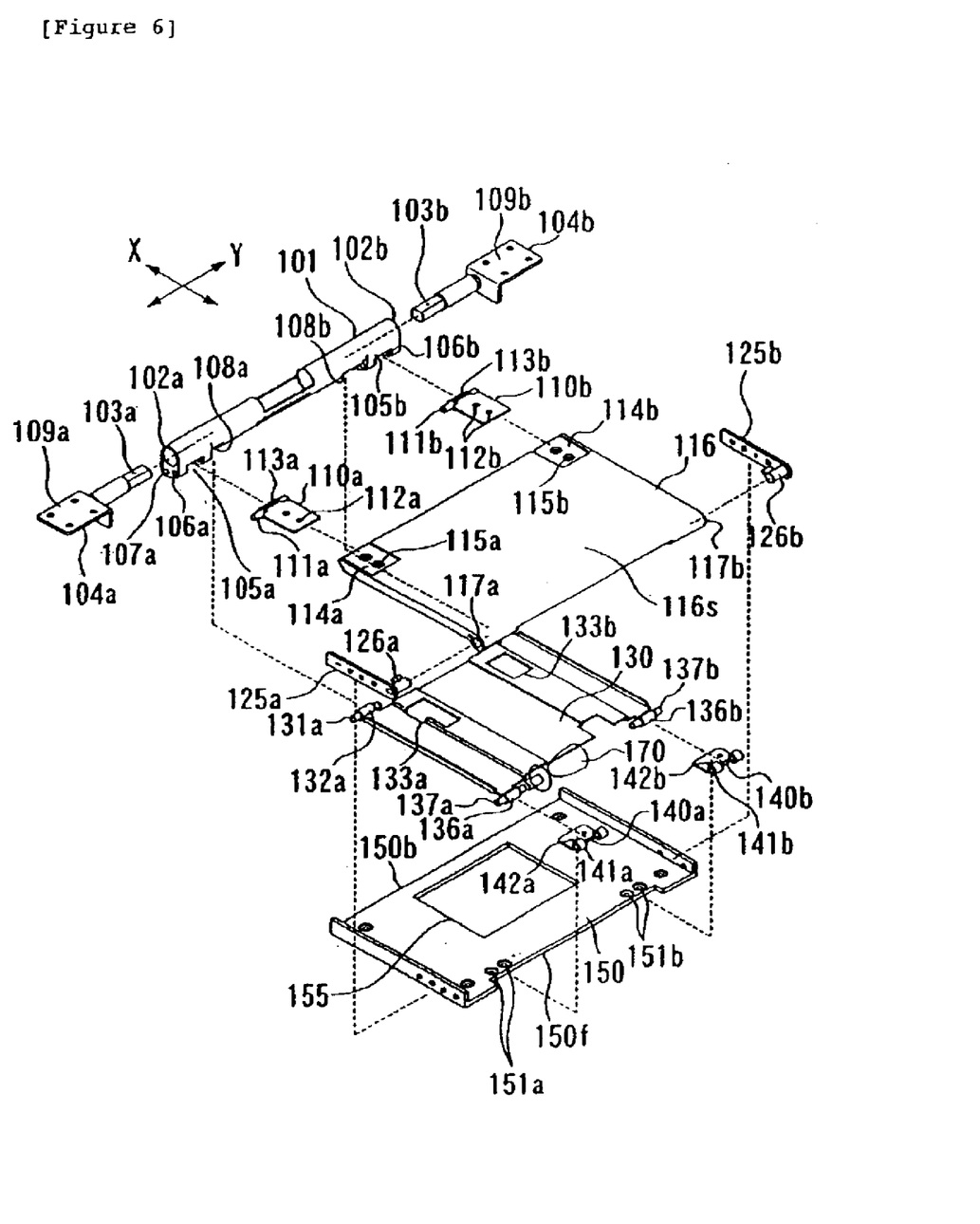
FIG. 6 is an exploded perspective view of an arm, a first hinge portion and a second hinge portion, according to an embodiment of the present invention.
Figure 7:
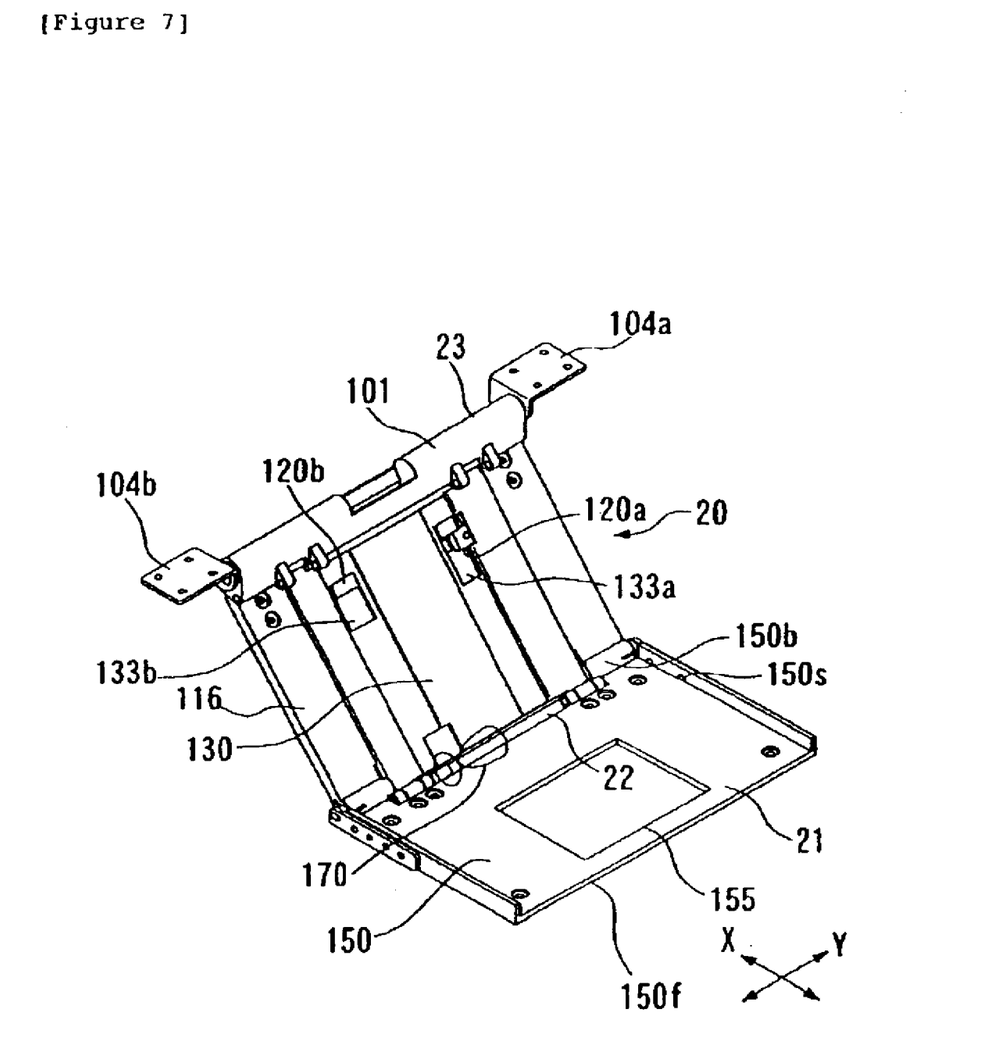
FIG. 7 is a perspective view of the arm, the first hinge portion and the second hinge portion in an assembled state viewed from a point at the rear of the notebook PC, according to an embodiment of the present invention.

FIG. 6 is an exploded perspective view of the arm 20, the first hinge portion 22 and the second hinge portion 23, according to an embodiment of the present invention. FIG. 7 is a perspective view of the arm 20, the first hinge portion 22 and the second hinge portion 23 in an assembled state viewed from a point at the rear of the notebook PC 11, according to an embodiment of the present invention.

As shown in FIGS. 6 and 7, the arm 20, the first hinge portion 22 and the second hinge portion 23 have, as their essential portions, a base (fixing portion, base unit) 150 connected to a recessed portion 21 of the main unit 13, a front plate (first supporting member) 116 and a rear plate (second supporting member) 130 connected to the base 150 and constituting the arm 20, and a top holding portion 101 connected to the arm 20 and constituting the second hinge portion 23. Signal lines (not shown) for supplying signals sent out from the main unit 13 to the monitor 15 to control images displayed on the display screen 14 are provided between the front plate 116 and the rear plate 130 to connect the main unit 13 and the monitor 15.

Shafts 103a and 103b of tie members 104a and 104b are inserted in end portions 102a and 102b at opposite ends of the top holding portion 101 in the direction (Y-direction) parallel to the axis of the top holding portion 101 so as to be movable about the Y-direction axis. Fixation surfaces 109a and 109b of the tie members 104a and 104b are connected and fixed to the lower end portion 15a of the monitor 15. Shafts (second pivots) 111a and 111b rotatably held by hitch portions 113a and 113b of connecting plates 110a and 110b for connection of the front plate 116 are inserted in holes 106a and 106b formed at front positions in lower opening portions 105a and 105b of the top holding portion 101. The connecting plates 110a and 110b are thereby connected to the top holding portion 101 so as to be rotatable about a Y-direction axis relative to the top holding portion 101. These connecting plates 110a and 110b are placed on recessed portions 114a and 114b formed at upper end portions of the front plate 116 and connections are made with engaging members (not shown) passed through holes 115a and 115b and holes 112a and 112b.

Shafts (third pivots) 131a and 131b (shaft 131b not shown in FIG. 6) rotatably held by hitch portions 132a and 132b (shaft 132b not shown in FIG. 6) of the rear plate 130 at the upper end portions are inserted in holes 107a and 107b (hole 107b not shown in FIG. 6) formed at rear positions in the lower opening portions 105a and 105b of the top holding portion 101. The rear plate 130 is thereby connected to the top holding portion 101 so as to be rotatable about a Y-direction axis relative to the top holding portion 101. When the front plate 116 and the rear plate 130 rotatably connected to the top holding portion 101 are superposed on each other as shown in FIG. 7, engaging projections 120a and 120b provided on the back surface of the front plate 116 are introduced into openings 133a and 133b of the rear plate 130. The width of the rear plate 130 in the Y-direction is smaller than that of the front plate 116, so that the back surface of the front plate 116 is exposed at side portions of the rear plate 130 at opposite positions in the Y-direction, as shown in FIG. 7, if it is seen from a point at the rear of the notebook PC 11.

Shafts 126a and 126b (first pivots) of tie members 125a and 125b for rotatably connecting the front plate 116 to the base 150 are inserted in holes 117a and 117b formed in the front plate 116 at the lower end. The tie members 125a and 125b are fixed to side portions 150s of a front end 150f of the base 150 in a state where the front plate 116 and the rear plate 130 are connected to each other, as shown in FIG. 7.

Shafts (fourth pivots) 137a and 137b rotatably held by hitch portions 136a and 136b of the rear plate 130 at the lower end are inserted in holes 141a and 141b of connecting plates 140a and 140b for connecting the rear plate 130 to the base 150. Fixation surfaces 142a and 142b of the connecting plates 140a and 140b are fixed on the back surface of the base 150 with the hitch portions 136a and 136b positioned at the front end 150f of the base 150. A cushioning component 170 for reducing a shock due to an abrupt change in angle is provided substantially at a center in the Y-direction at the lower end of the rear plate 130, as shown in FIG. 7.

According to various embodiments of the present invention and for exemplification, the structure of the arm 20, the first hinge portion 22 and the second hinge portion 23 are set forth in additional detail below.

Figure 8:
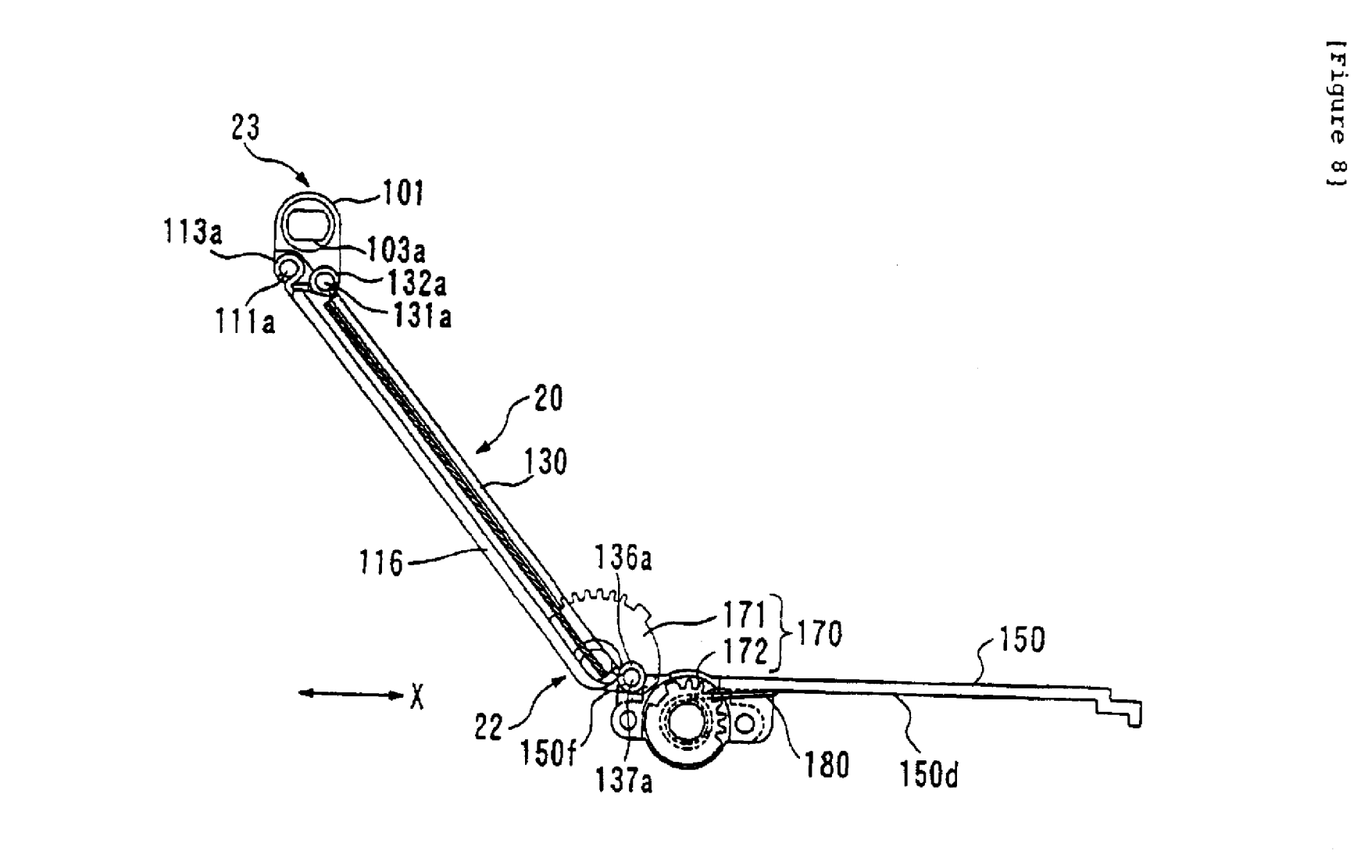
FIG. 8 is a cross-sectional view of the arm, the first hinge portion and the second hinge portion in the assembled state shown in FIG. 7.
Figure 9:
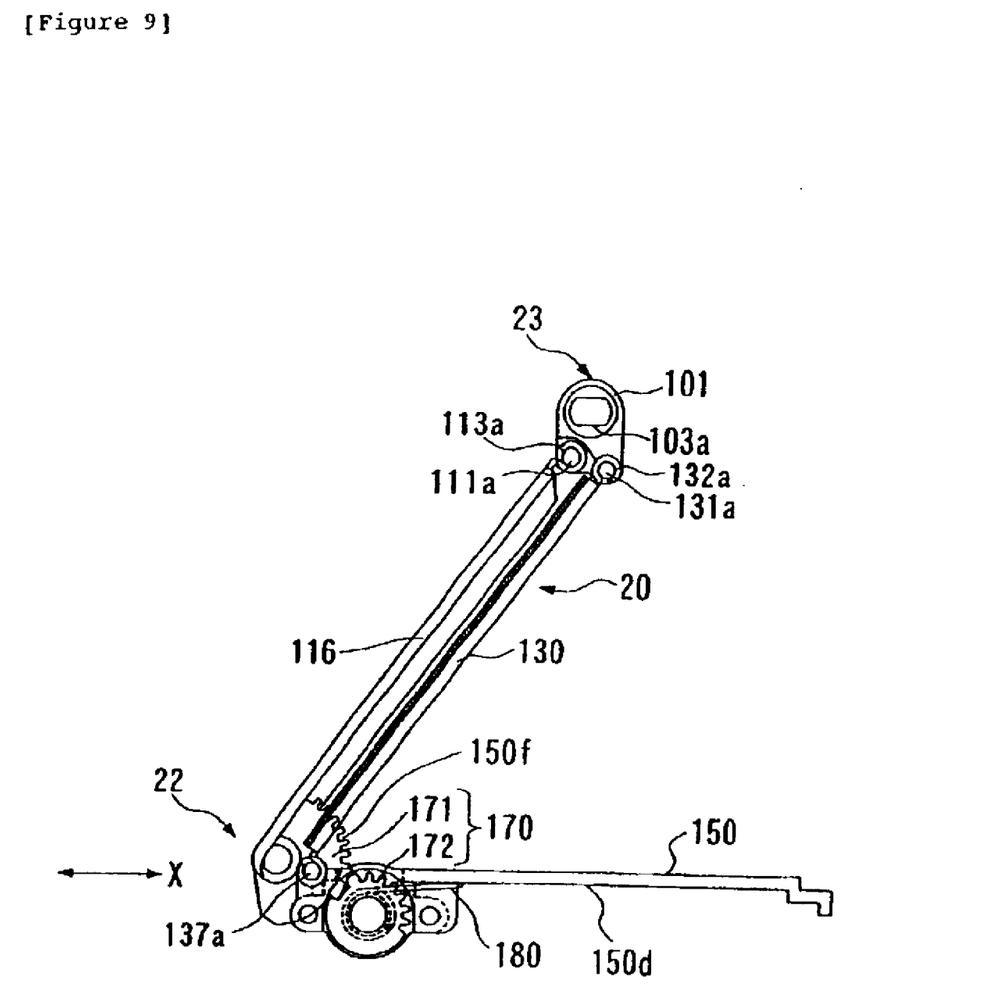
FIG. 9 is a cross-sectional view of the arm shown in FIG. 8 when the arm is tilted.
Figure 10:
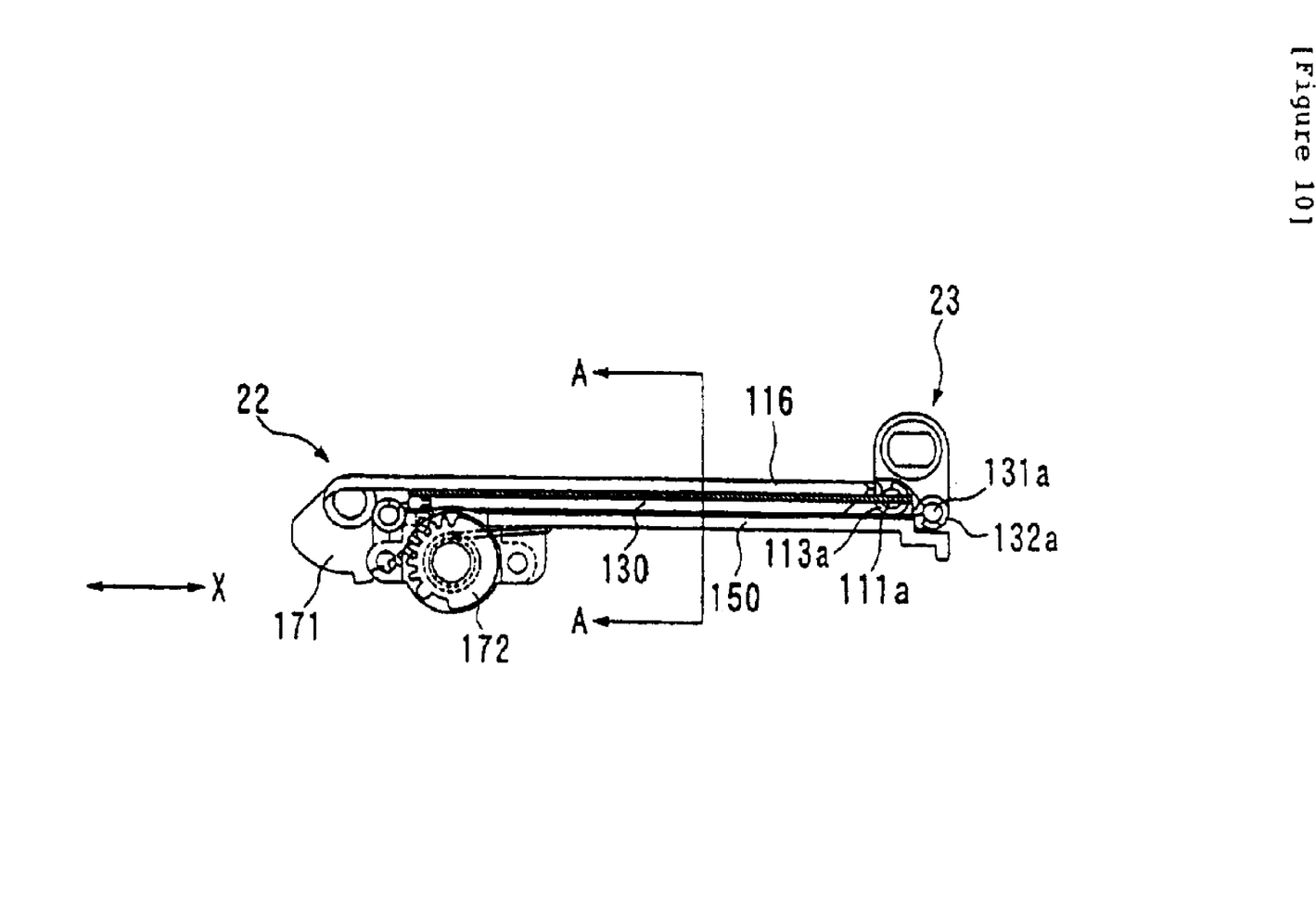
FIG. 10 is a cross-sectional view of the arm shown in FIG. 8 when the arm is laid completely flat.
Figure 11:
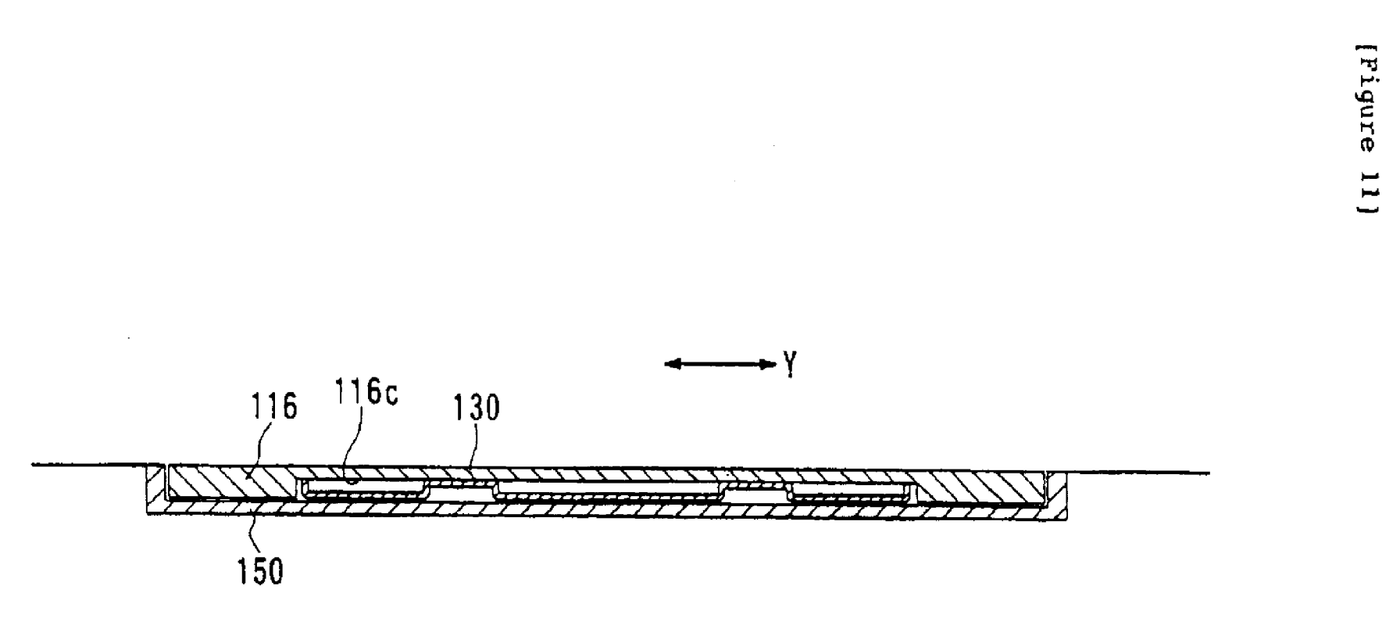
FIG. 11 is a cross-sectional view taken along the line A—A in FIG. 10.

FIG. 8 is a cross-sectional view of the arm 20, the first hinge portion 22 and the second hinge portion 23 shown in FIG. 7, showing the portions in the assembled state. FIG. 9 is a cross-sectional view of a state where the arm 20 shown in FIG. 8 is tilted. FIG. 10 is a cross-sectional view of a state where the arm 20 shown in FIG. 8 is laid completely flat. FIG. 11 is a cross-sectional view taken along the line A-A in FIG. 10.

As shown in FIG. 8, the arm 20 is formed in such a manner that the front plate 116 and the rear plate 130 are opposed to each other while being set in parallel with each other. In the second hinge portion 23, the hook-like hitch portion 113a engages with the shaft 111a with its opening facing in a direction (outward) opposite from the side where front plate 116 and the rear plate 130 are opposed to each other. The front plate 116 is thereby connected to the second hinge portion 23. Similarly, the hook-like hitch portion 132a engages with the shaft 131a with its opening facing outward. The rear plate 130 is thereby connected to the second hinge portion 23. In the first hinge portion 22, the hook-like hitch portion 136a engages with the shaft 137a with its opening facing outward. The rear plate 130 is thereby connected to the front end 150f of the base 150. Thus, the plurality of hook-like hitch portions 113a and 136a are used for connection to prevent shift and rattling in the connecting portions.

At the front end 150f of the base 150, the cushioning component 170 is constituted by a gear 171 provided on the arm 20 and a gear 172 provided on the base 150. The gear 172 is provided in a state of projecting on the back surface 150d side of the base 150. The base 150 is placed in the recessed portion 21 of the main unit 13 of the notebook PC 150. The gears 171 and 172 start meshing with each other when the arm 20 is brought closer to the base 150 as shown in FIG. 9.

The gear 172 is provided with a spring 180 which is engaged with the gear 172 and the back surface 150d of the base 150. A force is thereby constantly applied to the gear 172 to make the gear 172 rotate counterclockwise as viewed in the figure. That is, the force is applied in such a direction that the arm 20 is moved away from the base 150. Therefore, when the arm 20 is further folded from the state shown in FIG. 9 to such a state of being in contact with the base 150 as shown in FIG. 10, the arm 20 is prevented from being abruptly folded and can be completely folded by being moved and latched when a pressing force is applied thereto from the above. On the other hand, when the arm 20 is raised as shown in FIG. 9 from the folded state shown in FIG. 10, a user can easily raise the arm 20 by a comparatively small force since the above-mentioned rotating force is applied. Thus, the arm 20 can be moved with stability and safety when raised or retracted. Also, the monitor 15 or precision components of the main unit 13 can be prevented from being damaged by an impact caused when the monitor 15 is moved.

To apply the above-mentioned rotating force to the arm 20, a method other than the above-described method using the gears 171 and 172 and the spring 180 may be used. For example, a mechanism for applying the above-mentioned rotating force can be realized by combining a plurality of gears or by providing a resilient component. However, if the mechanism having components such as the gears 171 and 172 and the spring 180 shown in FIG. 8 is used, a rotating force can be effectively produced without making the gear 172 considerably large in size. In this case, the volume of the space for accommodating components in the main unit 13 is not considerably reduced.

When the arm 20 is completely folded as shown in FIG. 10, the rear plate 130 is accommodated in a recessed portion 116c of the front plate 116, as shown in the cross-sectional view of FIG. 11. Therefore, the actual thickness of the arm 20 in the folded state is equal to the maximum thickness of the front plate 116 and the arm 20 can be completely accommodated in the thin base 150. Consequently, the notebook PC 11 can be closed with the monitor unit 12 placing or the main unit 13, as is an ordinary conventional notebook PC.

Figure 12:
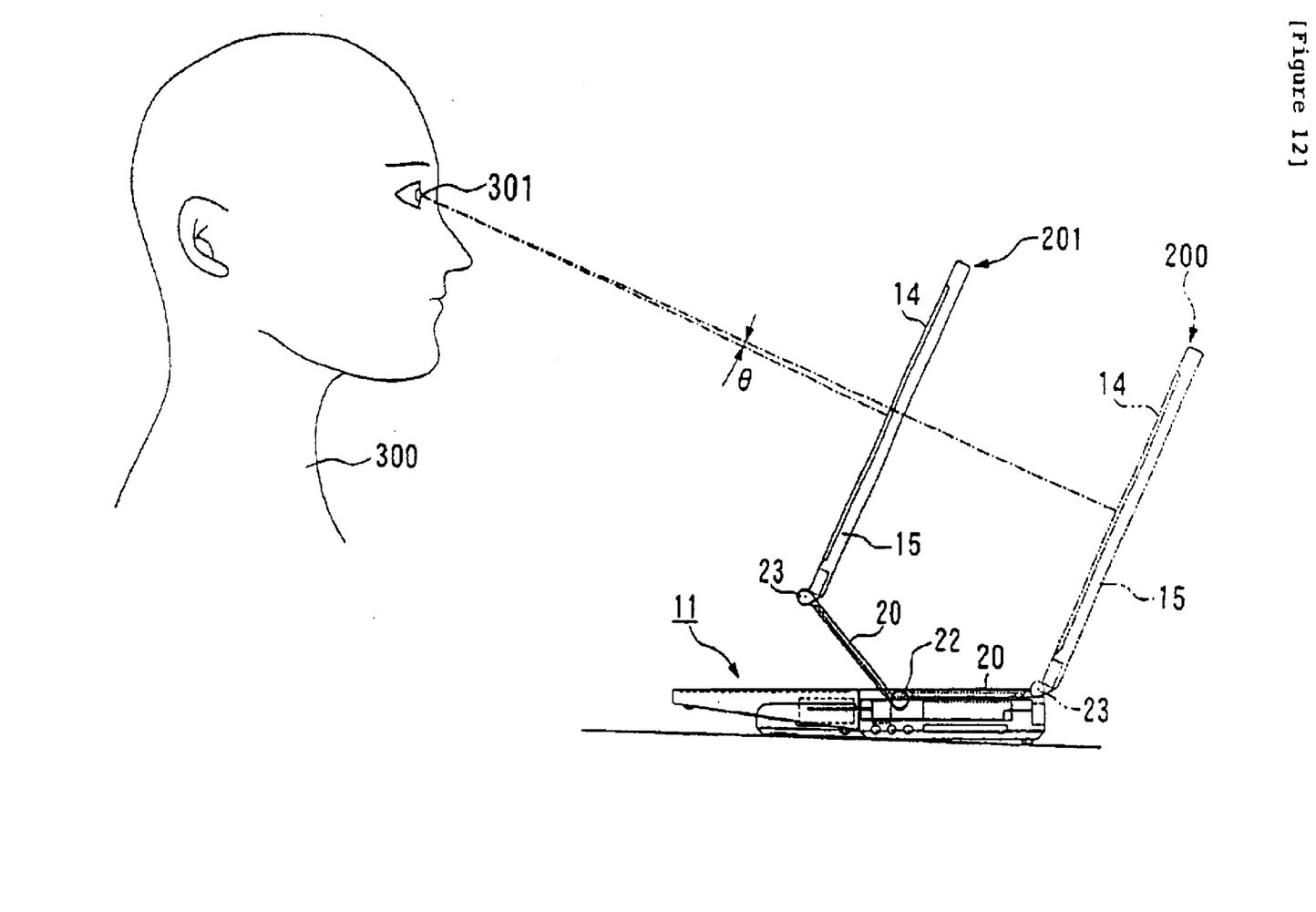
FIG. 12 is a diagram showing a change in state from the state shown in FIG. 10 to the state shown in FIG. 8 in the notebook PC.
Figure 13:
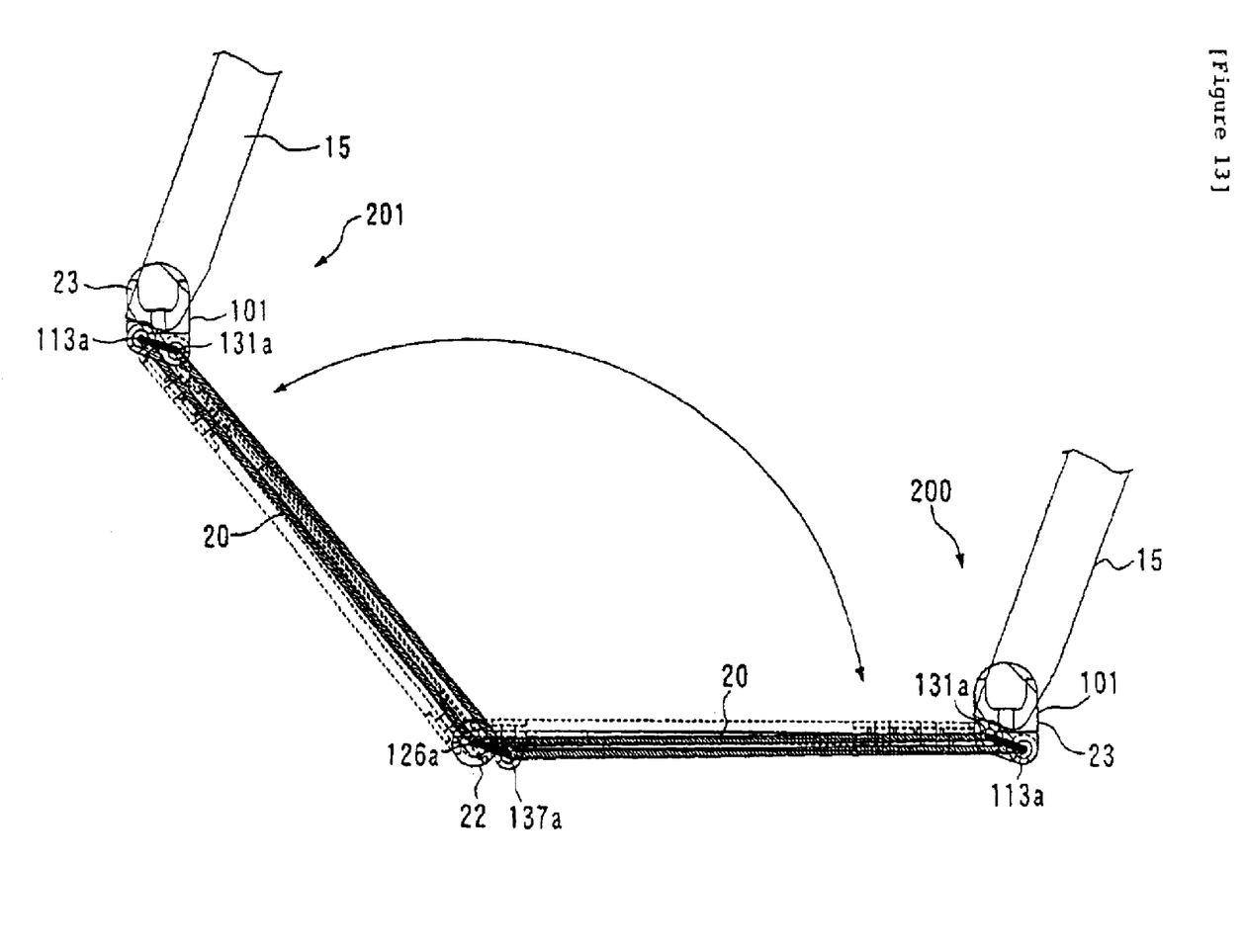
FIG. 13 is a diagram for explaining the movements of the arm and the monitor at the time of the change in state shown in FIG. 12.

FIG. 12 is a diagram showing a change in state from the state shown in FIG. 10 to the state shown in FIG. 8 in the notebook PC 11. FIG. 13 is a diagram for explaining the movements of the arm 20 and the monitor 15 at the time of the change in state shown in FIG. 12.

When in the notebook PC 11, as shown in FIG. 12, the arm 20 is moved from the folded state shown in FIG. 10 to the raised state shown in FIG. 8, the angle θ of the display screen 14 of the monitor 15 with respect to a viewing point 301 in front of the notebook PC 11 from which a user 300 views the display screen 14 is not substantially changed. The mechanism enabling the monitor 15 to be changed in height with substantially no change in the angle of the monitor 15 with respect to the viewing point 301 of the user 300 will be described below.

First, as shown in FIG. 13, the arm 20 forms a parallelogram having vertexes corresponding to the shaft 137a and the shaft 126a of the first hinge portion 22 and the shaft and the shaft 131a of the second hinge portion 23. Therefore, when the arm 20 is moved, for example, from the folded state 200 to the raised state 201 as shown in FIG. 12, the second hinge portion 23 moves upward as viewed in the figure since the positions of the shaft 126a and the shaft 137a in the first hinge portion 22 are fixed with a predetermined spacing maintained therebetween in the X-direction. Then a force causing clockwise rotation as viewed in the figure is applied to the top holding portion 101 of the second hinge portion 23 connected to the front plate 116 and the rear plate 130 connected to the shaft 126a and the shaft 137a in the first hinge portion 22. The top holding portion 101 is thereby rotated clockwise on the shaft 111a and the shaft 131a. That is, the arm 20 moves upward as viewed in the figure so that the line connecting the axes of the shaft 111a and the shaft 131a and the line connecting the axes of the shaft 126a and the shaft 137a are maintained parallel to each other, while the monitor 15 is rotating clockwise. Thus, the angle of the monitor 15 with respect to the viewing point 301 of the user 300 is not substantially changed.

In the notebook PC 11 according to this embodiment, as described above, the height of the monitor 15 can be adjusted while causing substantially no change in the angle of the monitor 15 with respect to the viewing point 301 of the user 300. Therefore it is not necessary for the user 300 to adjust the angle of the monitor 15 each time the user 300 changes the height of the monitor 15, and the user 300 does no feel inconvenience in using the monitor 15.

Since the cushioning component 170 and the spring 180 are provided, the height of the monitor 15 can be changed with stability without causing an abrupt change in the angle of the arm 20. Further, since a force is constantly applied to the arm 20 in the folded state in such a direction as to cause the arm 20 to rise, it is easy for the user 300 to raise the monitor 15 by drawing out the monitor 15. Also, when the arm 20 is accommodated in the recessed portion 21, it can be accommodated slowly and stably without causing an impact on the apparatus.

While in this embodiment the mechanism including the arm 20 and the first and second hinge portions 22 and 23 is applied to the notebook PC 11, the present invention is not limited to this application. For example, the mechanism can be applied to any other portable computers capable of displaying images.

In the computer according to this embodiment, the monitor unit 12 may be formed so as to be detachable from the main unit 13. In such a case, the monitor unit 12 constituted by the monitor 15, the second hinge portion 23, the arm 20, the first hinge portion 22 and the base 150, which is detached from the main unit 13, may be set on a receiving base for receiving the monitor unit 12 to be used by being connected to a desktop computer.

While the exemplary embodiments of the present invention have been described in portion with respect to processes and implementation of circuits and software, the present invention is not so limited. As would be apparent to one skilled in the art, the present invention can also be applied to a device which is connected to a computer, which has a plurality of members connected by an arm and two or more hinges, and in which the position in height the member facing a user can be changed without changing the angle with respect to the user. For example, the present invention can be applied to a device in which it is preferable to move a member facing a user without causing an abrupt change in angle and a device in which it is difficult to raise a member facing a user from a laid state, more specifically a touch pad and a keyboard used by a user to input data, or any other input device.

Also, other components may be added or some of the components may be removed in the arrangement described above as an embodiment of the present invention and changes and modifications may be made in the arrangement without departing from the scope of the present invention.

Unless explicitly stated otherwise, each numerical value and range should be interpreted as being approximate as if the word "about" or "approximately" preceded the value of the value or range. Similarly, the use of the term "substantially equal" should also be interpreted as being approximate, and inclusive of a reasonable error or difference in value as between two values due in portion to a design change, modification, tolerance measurement or manufacturing activity.

It will be further understood that various changes in the details, materials, and arrangements of the portions which have been described and illustrated in order to explain the nature of this invention may be made by those skilled in the art without departing from the principle and scope of the invention as expressed in the following claims. Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. A computer having a monitor with a display screen, comprising:

a main unit incorporating a controlling means for controlling display on the display screen; and an arm which connects said monitor and said main unit to each other, said arm including a front plate having a first end rotatably connected to a first pivot of said main unit, and a second end rotatably connected to a second pivot of said monitor, a rear plate having a first end rotatably connected to a third pivot of said main unit, and a second end rotatably connected to a fourth pivot of said monitor, said rear plate being linked to said front plate, and a resilient component provided on at least one of said front plate and said rear plate to apply a rotating force in such a direction that said monitor is moved away from said main unit.

2. The computer according to claim 1, wherein said second pivot and said fourth pivot are located at a lower end of said monitor.

3. The computer according to claim 1, wherein said first pivot and said third pivot are located at an end of said main unit and function as hinges for setting said monitor in a state of either being opened with respect to said main unit or for setting said monitor in a state of being closed with respect to said main unit.

4. The computer according to claim 1, wherein a first distance between said first pivot and said third pivot and a second distance between said second pivot and said fourth pivot are substantially equal, and a third distance between said first pivot and said second pivot and a fourth distance between said third pivot and said fourth pivot are substantiality equal.

5. A computer comprising:

display means for displaying an image to a user;

control means for controlling the image displayed by said display means;

accommodation means for accommodating said control means;

connection means connecting said accommodation means and said display means to each other and capable of freely setting the distance between said display means and a viewing point of the user within a predetermined range; and load means for imposing a load such that a force necessary for moving said display means away from said viewing point is larger than a force necessary for bringing said display means closer to said viewing point when said distance is adjusted.

6. The computer according to claim 5, wherein said connection maintains the angle of said display means with respect to said viewing point even when said distance is changed.

7. The computer according to claim 5, wherein said connection means is accommodated in a recessed portion provided in a surface of said accommodation means.

8. A monitor unit connected to a computer, said monitor unit comprising:

a monitor having a display screen, an arm extending from said monitor, a fixing portion on which said monitor and said arm are supported, a first hinge portion which rotatably connects said fixing portion and said arm to each other, a second hinge portion which rotatably connects said monitor and said arm to each other, and mechanism coupling the arm to said fixing portion wherein said mechanism causing height of said monitor to be adjusted relative to a datum with a substantially constant viewing angle of the display screen viewed from a viewing point in front of said display screen as said monitor is being adjusted from one position to a next position.

9. A monitor unit connected to a computer, said monitor unit comprising:

a monitor having a display screen, an arm extending from said monitor, a fixing portion on which said monitor and said arm are supported, a first hinge portion which rotatably connects said fixing portion and said arm to each other, a second hinge portion which rotatably connects said monitor and said arm to each other, and a resilient component for applying a rotating force in such a direction that said arm is moved away from said fixing portion wherein said arm has a front plate which extends from a front portion of said first hinge portion to a front portion of said second hinge portion, and a rear plate which extends from a rear portion of said first hinge portion to a rear portion of said second hinge portion.

10. The monitor unit according to claim 9, wherein said front plate and said rear plate are connected to the front portion of said first hinge portion and the rear portion of said first hinge portion with a predetermined spacing set therebetween.

11. A support structure for supporting a front face unit facing a user, wherein said support structure is capable of holding said front face unit at a predetermined angle, said support structure comprising:

an arm configurably connected to said front face unit to be rotatable on an axis in a lateral direction perpendicular to a longitudinal direction from a front portion to a rear portion of said front face unit, a base unit configurably connected to said arm to be rotatable along the lateral axis by a predetermined external force in order to support said front face unit, and a signal processing portion for performing transmitting and receiving of signals between said front face unit and a computer connectable to said front face unit, wherein said arm further comprises:

a first supporting member which extends from the front portion of said front face unit and is connected to said base unit, a second supporting member which extends from the rear portion of said front face unit, is connected to said base unit, and is linked to said first supporting member, and a resilient component which applies a rotating force in such a direction that said second supporting member is moved away from said base unit.

12. The support structure according to claim 11, wherein said first supporting member is connected to a front portion of said base unit, and said second supporting member is connected to a rear portion of said base unit.

13. The support structure according to claim 11, wherein an arrangement approximating a parallelogram is formed by a first connecting portion in said base unit to which said first supporting member is connected, a second connecting portion in said front face unit to which said first supporting member is connected, a third connecting portion in said base unit to which said second supporting member is connected, and a fourth connecting portion in said front face unit to which said second supporting member is connected.

14. The support structure according to claim 11, wherein said support structure being mounted on a portable computer.

15. The monitor unit of claim 8 further including a computer and keyboard positioned relative to said datum.

16. The monitor unit of claim 8 wherein said mechanism includes a pair of gears positioned to engage each other with one of said pair of gears mounted of said fixing portion and another of said pair of gears mounted on the arm.

17. The monitor unit of claim 16 further including a resilient component for applying a rotating force in such a direction that said arm is moved away from said fixing portion.

18. A structure for use with a computer comprising:

an arm;

a base member;

a first hinge portion rotatably coupling said arm to said base member;

a second hinge portion rotatably mounted on an end of said arm and being displaced from said first hinge portion; and a pair of gears operatively mounted on said arm and said base member wherein said gears coact to move said arm relative to the base member.

19. The structure of claim 18 further including a device operatively mounted to said second hinge portion.

20. The structure of claim 19 wherein the device includes a monitor with a display screen.

* * * * *